March 1, 1955  W. T. GLOOR  2,703,012
WEIGHING SYSTEM
Filed April 21, 1952  2 Sheets-Sheet 1

INVENTOR
WILBUR T. GLOOR
BY
ATTORNEY

March 1, 1955 W. T. GLOOR 2,703,012
WEIGHING SYSTEM
Filed April 21, 1952 2 Sheets-Sheet 2
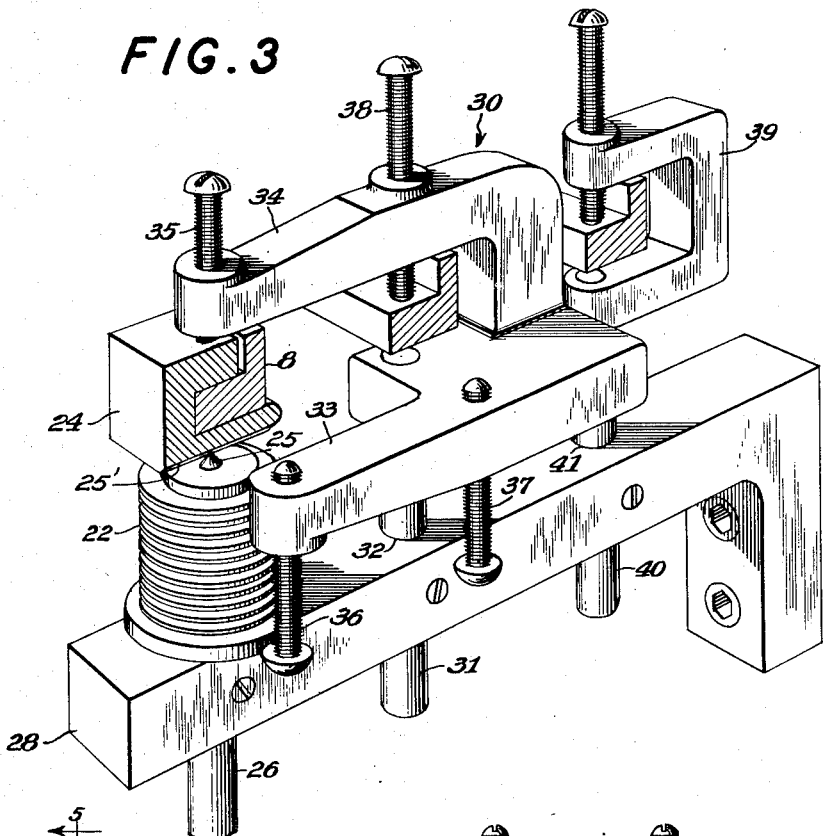
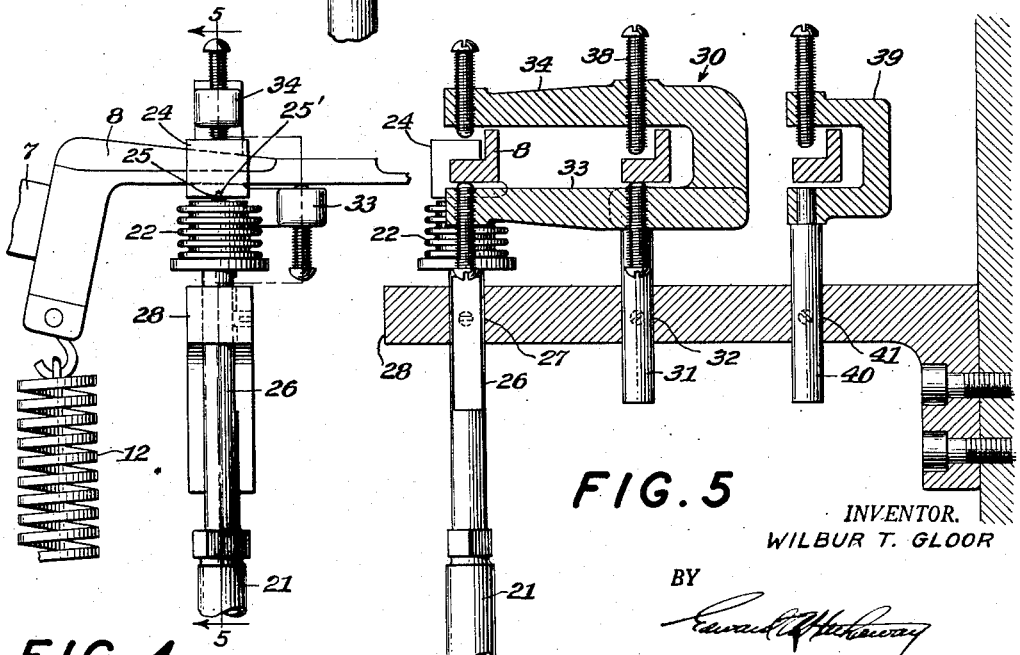
INVENTOR.
WILBUR T. GLOOR
BY
ATTORNEY

United States Patent Office 2,703,012
Patented Mar. 1, 1955

2,703,012

WEIGHING SYSTEM

Wilbur T. Gloor, South Norwalk, Conn., assignor to Baldwin-Lima-Hamilton Corporation, a corporation of Pennsylvania Application April 21, 1952, Serial No. 283,351

4 Claims. (Cl. 73—397)

This invention relates generally to a multi-load range weighing system especially adapted for measuring very small load capacities in materials testing machines which are initially built for measuring substantial load capacities.

My invention is disclosed herein as applied particularly to a materials testing machine of the type employing a hydraulic weighing capsule or support such as is shown, for example, in Emery Patent 1,848,468 although the invention may be used with any equivalent machine including broadly a machine having a hydraulic loading cylinder whose fluid pressure is determined directly as a measure of the specimen load. Either the loading cylinder or the hydraulic support is connected to a Bourdon tube which controls a baffle over an air jet for actuating an indicator as shown in Tate Patent 2,212,085.

A machine that is initially built for weighing relatively large loads is not sufficiently sensitive for measuring extremely low loads. To overcome this there has been heretofore provided a very sensitive load cell preferably of the pneumatic type, such as shown in Tate Patent 2,501,623, connected to its own low load range Bourdon tube. This Bourdon tube in turn is provided with its own baffle and air jet for operating the usual load indicating system which is normally operated by the high load capacity Bourdon tubes. To add the low load range Bourdon tube so as to supplement the high range tubes has involved complications in structure as well as excessive expense. Also, the complications in adding very low load operation to existing materials testing machines already in the field were sufficiently great that it has been necessary to return the Bourdon tube indicating system to the factory to obtain proper installation of the low load Bourdon tube equipment.

It is an object of my invention to provide an improved multi-load range fluid responsive weighing system for measuring very low loads as well as high capacity loads and in which there is provided a cooperative arrangement of elements that is relatively simple and compact and which is conducive to a high degree of sensitivity, accuracy and response for each of the load ranges.

Another object is to provide an improved multi-load range fluid responsive weighing system in which each load range has parts so structurally and functionally inter-related to each other that the low load range may effectively employ the higher load range mechanism without in any way sacrificing the desirable functional characteristics of each load range individually.

A further object is to provide improved means for measuring low loads that can be readily and economically installed in existing fluid responsive weighing systems having high load range capacities, thus facilitating the installation of a low load range in existing equipment already in the field.

Other objects and advantages will be more apparent to those skilled in the art from the following description of the accompanying drawings in which:

Fig. 3 is an enlarged perspective showing a bracket and other structure for permitting easy and economical installation of the low load range to existing equipment in the field;

Fig. 4 is an enlarged fragmentary side elevation of the end of a Bourdon tube and the low load range bellows which cooperates with the tube; and Fig. 5 is a sectional view taken substantially on the line 5—5 of Fig. 4.

Figures 1, 2:
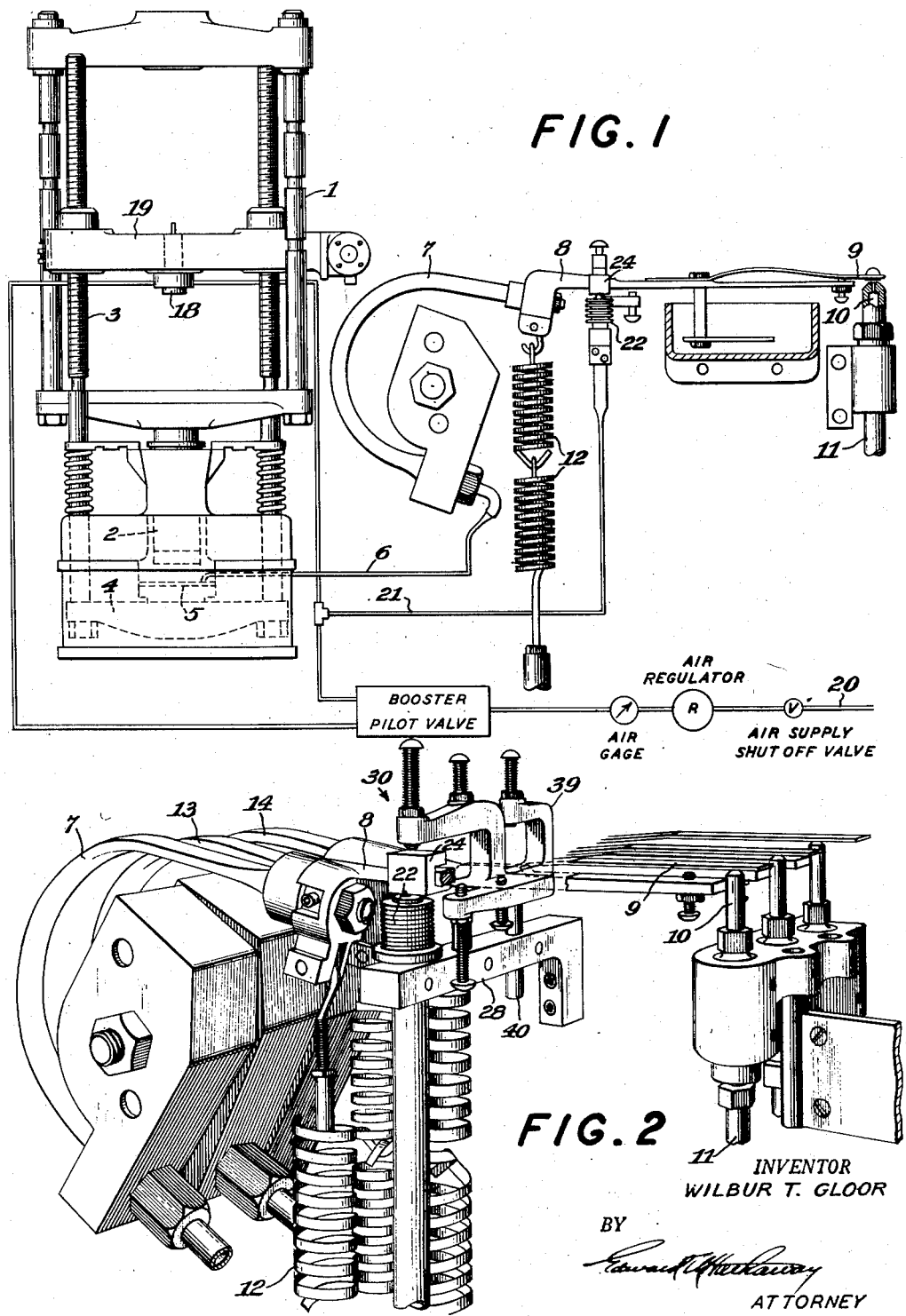
Fig. 1 is a schematic elevational view of my improved multi-load range system shown in connection with a hydraulic support type materials testing machine.
Fig. 2 is a perspective of the high load range Bourdon tubes shown in cooperation with my very low load range measuring device.

In the particular embodiment of the invention disclosed herein I have shown my invention in connection with a so-called Emery type testing machine having a loading frame 1 operated by a hydraulic cylinder and ram 2 and a load sensitive frame 3 whose lower crosshead 4 bears upwardly against a hydraulic support or capsule 5. The usual specimen load applied to this capsule produces hydraulic pressure therein which is transmitted through a pipe 6 to a Bourdon tube 7 whose free closed end is provided with an arm 8. The Bourdon tube 7 may be connected to the loading cylinder 2 rather than to the support 5 depending upon the degree of sensitivity and accuracy desired. The arm 8 carries a baffle 9 at its outer end for controlling an air jet orifice 10. As disclosed in said Tate Patent 2,212,085, movements of the Bourdon tube in response to varying loads will cause corresponding variations in pressure in the passage 11 leading to orifice 10. This variation in air pressure controls a suitable servo-motor (not shown) which operates an indicating hand over a usual dial and is adapted to restore the baffle to substantially its initial position through an iso-elastic spring 12. As shown in Fig. 2 there are a plurality of Bourdon tubes 7, 13 and 14 of different load capacities and each provided with its own air jet and baffle and iso-elastic spring.

The hydraulic support 5 is of such a nature that for large load capacity machines it is not feasible to measure extremely small loads. Hence, there has heretofore been provided a pneumatic load cell 18, Fig. 1 detachably supported in the upper crosshead 19 of the load sensitive frame 3. One form of pneumatic cell that may be used is shown in Tate Patent 2,501,623 and hence further detailed description herein is not necessary. It will suffice to say that air flow through a supply pipe 20 to the air cell 18 is controlled by the elements whose symbols are indicated in Fig. 1, while the air pressure which occurs in the cell is sensitive to and is a measure of the load being weighed and is transmitted through a pipe 21. This pipe, as shown in Fig. 1 of said Tate Patent 2,501,623, has heretofore been connected to an indicating instrument which generally has been a very sensitive low capacity Bourdon tube. This Bourdon tube is in addition to the usual higher capacity tubes shown in Fig. 2.

In my present invention I eliminate the need for an additional Bourdon tube with its own individual air jet and baffle, or other equivalent type of servo-motor controlling elements, and instead thereof I utilize one of the existing higher capacity Bourdon tubes by connecting the load sensitive pressure passage 21 to a bellows 22, Fig. 1. This bellows is supported immediately beneath the arm 8 of the lowest capacity Bourdon tube 7 and is connected by the provision of a special clamp 24, Fig. 3, suitably secured to the arm 8 as shown. The upper free end of the bellows is provided with a suitable tapered centering pin 25 while the lower stationary end of the bellows is provided with and supported by a hollow stem 26, Fig. 5, extending through and secured to a suitable opening 27 in a stationary bracket 28, the pipe 21 being connected to hollow stem 26. The under side of clamp 24 has a slot 25′, Fig. 3, to receive the point 25. The slot is parallel to the length of arm 28 and thus permits the block to fit varying tube arms 8 in the field while at the same time giving a definite point of application for the centering point 25. It will be understood that bellows 22 has an effective pressure area of such size that it will move the Bourdon tube arm 8 in response to any desired low specimen load. In the specific embodiment shown herein the effective pressure area of the bellows is about one-half inch and is responsive to specimen loads as low as 2 pounds provided that the air cell 18 is correspondingly arranged for this capacity.

In operation, when the air cell 18 has a load applied thereto, air pressure produced in the cell in proportion to the specimen load is transmitted through pipe 21, Fig. 1, to bellows 22 to move the centering pin 25, Fig. 3, into contact with clamp 24 on the arm 8 of the lowest capacity Bourdon tube 7 and cause movement of the arm 8 in proportion to the very low air pressure in bellows 22 thereby to actuate baffle 9 for controlling air jet orifice 10 and effecting operation of a usual indicator, not shown, to indicate the load. In addition to the air pressure in bellows 22, the Bourdon tube 7 will have a very small supplemental hydraulic pressure exerted thereon by reason of specimen load applied to the hydraulic support 5 from which pressure is transmitted through passage 26 to the Bourdon tube, Fig. 1. This hydraulic pressure is not sufficient in and of itself to cause any appreciable movement of the free end of the Bourdon tube but it does function to help sensitize the tube so that it is highly sensitive to air pressure in bellows 22. If, for any reason, it is desired to calibrate out the the effects of the hydraulic pressure from the hydraulic support 5, a specially calibrated iso-elastic spring may be substituted for the spring 12, Fig. 1, so as to cause the free end of the Bourdon tube to move solely in proportion to the air pressure in bellows 22. When a low load weighing operation is completed and the air pressure in bellows 22 is released, the bellows will collapse sufficiently to remove the centering pin 25, Fig. 3, from contact with clamp 24 on arm 8 thereby to permit the Bourdon tube 7 to have complete freedom of movement when this tube is used for measuring loads within its own load range. Thus, it is seen that the low load bellows 22 may remain in position at all times and yet may be readily brought into full cooperative relation to the Bourdon tube merely by the application of air pressure to the air cell. The bellows and Bourdon tube thus provide a highly cooperative relationship of elements that is extremely simple in construction and operation and has a high degree of convenience in installation. As a result of this convenience of installation a low load application may be easily and readily made in existing equipment in the field.

To facilitate such ease of installation in the field I preferably provide, as shown in Fig. 3, a stop bracket generally indicated at 30 having a stem 31 extending through an opening 32 in the stationary bracket 28. The stop bracket 30 has arms 33 and 34 extending forwardly so as to carry upper and lower adjustable screws stops 35 and 36 for limiting the vertical movement of the arm of Bourdon tube 7. The same bracket has similar screw stops 37 and 38 for the Bourdon tube 13. The last Bourdon tube 14 has a single stop bracket 39 whose stem 40 extends through an opening 41 in bracket 28. Ordinarily each Bourdon tube would have its own individual stop bracket similar to 39 and the stems for the other individual brackets, if used, would pass through the openings 27 and 32.

However, in my improved arrangement I utilize the opening 27, Fig. 5, to support the bellows 22 and then in order to provide a necessary stop for the Bourdon tube 7, I discard the single stop for the next Bourdon tube 13 and utilize its hole 32 to support the double stop bracket 30. Thus, the installation of the bellows 22 may be made most expeditiously in the field while at the same time providing the necessary stops for the Bourdon tube arms.

From the foregoing disclosure it is seen that I have provided a very simple, effective and highly compact, as well as economical, arrangement for producing a low load range that may be easily and readily installed in existing equipment in the field without in any way sacrificing the high degree of sensitivity, accuracy and response of either the higher or very low load ranges.

It will, of course, be understood that various changes in details of construction and arrangement of parts may be made by those skilled in the art without departing from the spirit of the invention as set forth in the appended claims.

I claim:

1. A multi-load range weighing system comprising, in combination, a fluid pressure responsive element having a movable portion, means controlled by said movable portion so as to produce an effect in proportion to the pressure which actuates the pressure responsive element, a second fluid pressure responsive element engageable with said movable portion of the first element for moving said movable portion thereby to utilize said controlled means to produce an effect in proportion to the fluid pressure which actuates said second responsive element, separate sources of pressure fluid for respectively actuating said first and second responsive elements, the load capacity of the first responsive element being greater than the load capacity of the second responsive element, and said sources of pressure fluid being connected to their respective responsive elements so that both of the latter are simultaneously subjected to their respective pressures but the sensitivity of the first responsive element being sufficiently smaller than the second responsive element so that the latter produces substantially the entire actuating force for said movable portion of the first responsive element when the second responsive element is in operation during which time the pressure in the first fluid pressure responsive element renders the second responsive element more freely movable to the relatively small pressure of its source.

2. A multi-load range weighing system comprising, in combination, a plurality of Bourdon tubes placed in side by side relation to each other and having one of their corresponding ends anchored and the other of their corresponding ends free to move, a common pressure source connected to all of said tubes, a bellows engageable with a movable portion of the free end of one of the Bourdon tubes, a second pressure source for said bellows, said second source being separate from said common source, a bracket for supporting said bellows so that upon expansion of the bellows it moves in a direction substantially tangent to the direction of movement of the free end of the Bourdon tube which is engaged by the bellows, and a stop arm also supported by said bracket and having portions overlying two of the free ends of the Bourdon tubes so as to provide limit stops therefor.

3. The combination set forth in claim 2 further characterized in that said supporting bracket has openings therethrough and the stop arm has a shaft receivable in one of said openings while the bellows has a shaft receivable in the other opening.

4. A multi-load range weighing system comprising, in combination, a Bourdon tube having one end fixed and its other end free to move substantially about the center of the tube in response to pressure from a given source, means controlled by said free end so as to produce an effect in proportion to the pressure which acuates the Bourdon tube, a second fluid pressure device responsive to pressure from a second source and having fixed and movable portions, means for supporting said fixed portion of said pressure responsive device so that the movable portion thereof is separated from the free end of the Bourdon tube when the latter is functioning to measure the pressure to which it is subjected, and means on the movable portion of said second fluid pressure device engageable with the free end of the Bourdon tube when the second fluid pressure device is subjected to fluid pressure from the second source.

References Cited in the file of this patent

UNITED STATES PATENTS

| | | |
|---|---|---|
| 2,212,085 | Tate | Aug. 20, 1940 |
| 2,264,263 | Erbguth | Nov. 25, 1941 |
| 2,296,714 | Ibbott | Sept. 22, 1942 |
| 2,309,314 | Harshaw | Jan. 26, 1943 |
| 2,331,871 | Tate | Oct. 19, 1943 |
| 2,356,442 | Birch | Aug. 22, 1944 |
| 2,639,616 | Tate | May 26, 1953 |

FOREIGN PATENTS

| | | |
|---|---|---|
| 15,241 | Great Britain | 1912 |
| 974,810 | France | Oct. 4, 1950 |